United States Patent [19]

Pott

[11] Patent Number: 4,507,164

[45] Date of Patent: Mar. 26, 1985

[54] METHOD AND APPARATUS FOR MAKING A FILAMENTARY WEB

[75] Inventor: Richard Pott, Lage/Lippe, Fed. Rep. of Germany

[73] Assignee: Aerotex Hochleistungsfaser GmbH, Krefeld, Fed. Rep. of Germany

[21] Appl. No.: 407,161

[22] Filed: Aug. 11, 1982

[30] Foreign Application Priority Data

Aug. 19, 1981 [DE] Fed. Rep. of Germany ....... 3132697

[51] Int. Cl.³ .......................... B32B 5/12; B32B 7/14
[52] U.S. Cl. .................................... 156/177; 156/181; 156/434; 156/441
[58] Field of Search ............... 156/177, 181, 178, 434, 156/441, 291, 324, 555, 247, 248, 249, 540, 541, 238, 439, 290; 428/295, 198

[56] References Cited

U.S. PATENT DOCUMENTS

| | | | |
|---|---|---|---|
| 3,383,263 | 5/1968 | Storti | 156/291 |
| 3,459,615 | 8/1969 | Eilerman | 156/181 |
| 3,622,429 | 11/1971 | Kippan | 428/198 |
| 3,953,641 | 4/1976 | Marquis | 156/181 |
| 4,372,801 | 2/1983 | Bascom et al. | 156/434 |

Primary Examiner—Michael Ball
Attorney, Agent, or Firm—Peter K. Kontler

[57] ABSTRACT

A method and an apparatus are described for making a filamentary web. One or more strands of roving, each composed of multiple filaments, are spread out to increasing extents until the filaments form a band in which they extend unidirectionally and generally parallel to each other, but are not connected with one another. Adhesive strips, threads or other connecting elements are then transported on a carrier into a working station so as to be positioned transverse to the elongation of the band. In the working station, they are transferred to the band and joined to the filaments under application of contact pressure in the nip between cooperating nip rollers. This converts the band into a unitary filamentary web structure in which the filaments are all unidirectionally oriented.

31 Claims, 6 Drawing Figures

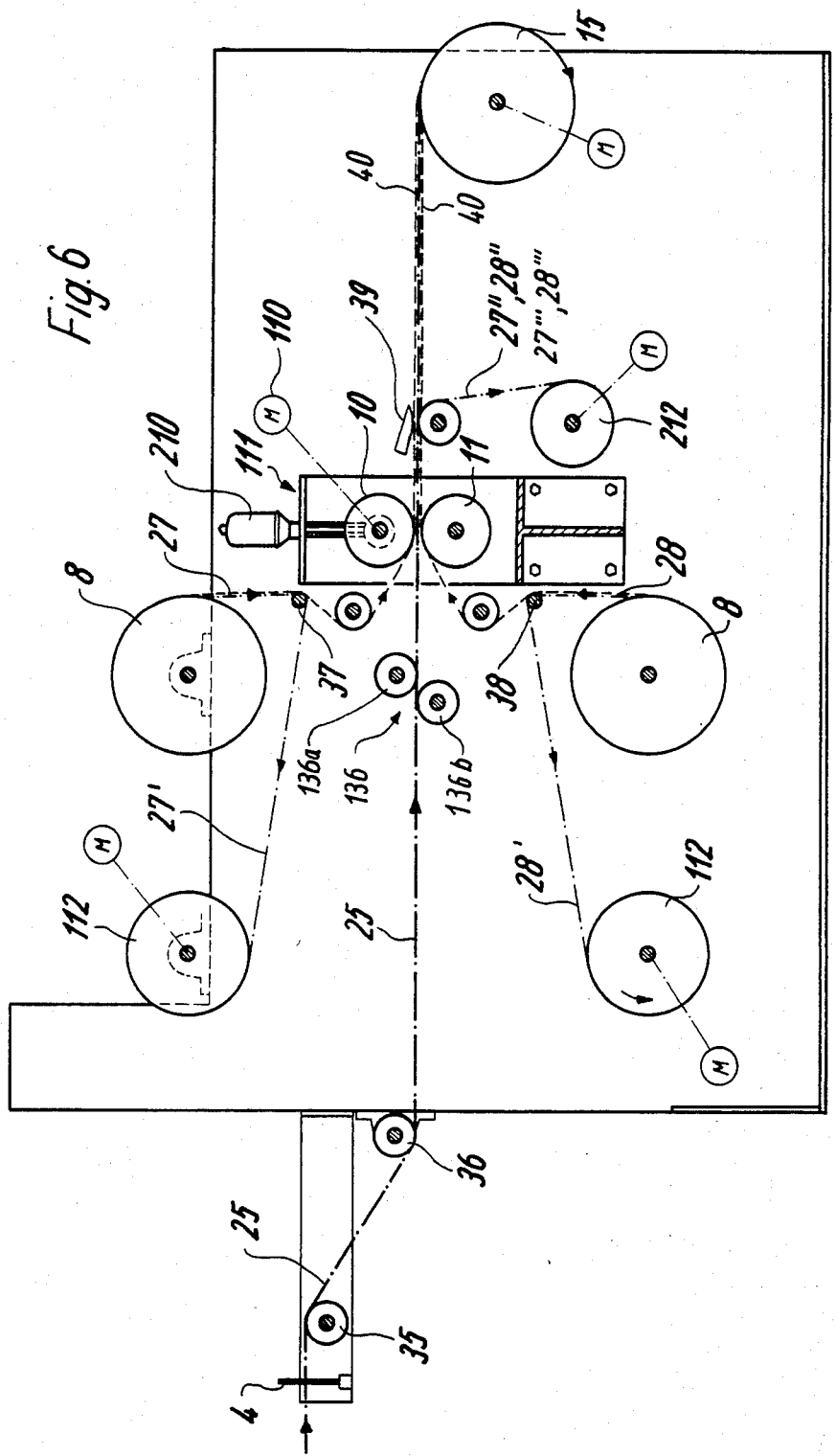

METHOD AND APPARATUS FOR MAKING A FILAMENTARY WEB

BACKGROUND OF THE INVENTION

The present invention relates to filamentary webs, i.e. non-woven webs composed of filaments rather than fibers.

More particularly, the invention relates to a method of making such filamentary webs.

The invention also relates to an apparatus for making such filamentary webs, i.e. to an apparatus for carrying out the method.

Non-woven filamentary webs, which are composed of long filaments as opposed to woven webs which are composed of short fibers, are already known per se. For example, German Published Application DE-OS No. 2,320,133 discloses a web of the type in question.

However, the prior art relating to these webs has various disadvantages. The basic web structure is defined by the longitudinally extending parallel high-strength filaments; to make the web usable as a coherent structure, these filaments must be connected with each other in direction transversely of their elongation. This is accomplished by providing one or both of the major web surfaces with transversely extending threads of synthetic plastic material; these threads are melted so as to bond with the filaments. One problem with this arrangement is the heating of the connecting threads to the requisite melting (and bonding) temperature since the required heat tends to adversely affect the strength and integrity of the filaments being connected.

Another problem is the manner of heating the threads. This is generally accomplished with the aid of two melting jaws, one or both of which are heated. If, in fact, two of these jaws are used, then the affixing of the threads to the filaments can be carried out only discontinuously. This is often unsatisfactory because it limits the operation to a relatively low production rate. A continuous operation is possible if only a single jaw is used; however, then the problem arises how to heat the threads quickly enough (i.e. within a fraction of a second) to melting temperature. Also, the prior art leaves much to be desired as to the positioning accuracy of the threads on the filaments so that the reliability of the filament connection with these meltable threads is at best uncertain.

Another prior-art approach—which is mentioned as such in the aforementioned German Published Application—suggests a woven web in which the weft consists of uncovered or braid-covered carbon filaments and the warp consists of natural or synthetic fibers. One problem with this proposal is that the final product is not as strong as the one discussed hereinbefore. Another problem is that the manufacture of this product is very expensive. The most telling disadvantage, however, resides in the fact that it is not possible to produce a web having flat surfaces. Since webs of the general kind under discussion are often used as reinforcements in thin-walled structural components—such as gliders speed boats and helicopter rotors, to name just a few—this is unacceptable.

SUMMARY OF THE INVENTION

Accordingly, it is a general object of the present invention to overcome the disadvantages of the prior art.

A more particular object of the invention is to provide an improved method of making a filamentary web which is not possessed of the prior-art disadvantages.

Another object of the invention is to provide such a method which will result in the manufacture of a superior product, i.e. a product that is free of the prior-art drawbacks.

An additional object is to provide a method of the kind under discussion wherein heating of the filaments by, or as a result of the application of, the applied connecting elements is avoided.

Still a further object is to provide such a method which assures exact placement of the connecting elements relative to the filaments.

A concomitant object is to provide an apparatus for carrying out the method.

In keeping with these objects, and with still others which will become apparent hereafter, one feature of the invention resides in a method of making a filamentary web, particularly from filaments which are carbon-based, aramide-based, polyester-based or glass-based.

Briefly stated, such a method may comprise the steps of forming an elongated band which is composed of a plurality of filaments which are unidirectional in orientation as well as being physically unconnected with one another. This band is then advanced through a working station and a series of elongated connecting elements is transported to that same station. These connecting elements are thread-like, strip-like or of analogous configuration and are so oriented that their elongation is transverse to the elongation of the filaments. In the working station, the connecting elements are transferred and bonded to the filaments under application of contact pressure so that they now connect the filaments with each other and join them together to form a unitary filamentary web in which the filaments are all unidirectional.

The non-woven unidirectional filamentary web has very considerable advantages over the prior art, especially over woven webs of the prior art. For example, in the case of carbon filaments, the tensile strength and the modulus of elasticity along the zero-axis of a web produced in accordance with the present invention are approximately 30% and 40% higher than the respective parameters in woven webs. The reason for this is that the over/under thread intersections of prior-art woven webs of this type reduce the physical strength of those webs.

Another aspect of the invention resides in an apparatus for making filamentary webs of the type under discussion, i.e. for carrying out the aforementioned method. Again briefly stated, such an apparatus may comprise means for supplying at least one strand that is composed of a plurality of unconnected elongated filaments, and means for forming these filaments into the shape of an elongated band in which the filaments continue to be unconnected but are unidirectionally oriented relative to each other. Means may then be provided for advancing the thus-formed band through a working station, and further means for transporting elongated connecting elements to the working station in such a manner that at least on arrival at that station the connecting elements extend transverse to the elongaton of the band (and hence of the filaments). Finally, additional means may be present for transferring the connecting elements onto the filaments under application of contact pressure and affixing the connecting elements (as by bonding) to the filaments thereby joining the filaments to form a unitary filamentary web in which the filaments are unidirectionally oriented.

The present invention makes it possible, inter alia, to feed and affix to unidirectionally oriented filaments a series of connecting elements in continuous manner, without the danger (inherent in the prior art) that the area of contact between them might shift or otherwise change. In other words, accuracy of positioning of the connecting elements relative to the filaments is assured.

In the present invention, the thin connecting elements, which may or may not be provided with a bonding agent, unite the unidirectionally oriented filaments into a unitary whole (i.e. a filamentary web) without, however, in any way negatively influencing the surface of this web or the surfaces of the filaments in the web. Neither their presence nor the manner in which they are applied and affixed to the filaments has any negative consequences for the web. The filaments are in at least some tension at the time the connecting elements are applied to them.

To restate the foregoing somewhat differently, the invention proposes to have one or more strands of filamentary roving (each strand consisting of a plurality of filaments) supplied by one or more spools or bobbins. Each strand continuously advance in untwisted condition continuously towards a working station. On its way to the working station, it is spread out in transverse direction so as to create a planar band composed of a plurality of unidirectionally oriented filaments which are unconnected with each other, i.e. which move (in tension) together but individually through space. Only when this is accomplished does the band reach the working station—and only then are the filaments contacted by the connecting elements which unite them into a filamentary web of unitary character. This makes it possible to feed the band continuously and, despite the fact that the filaments making up the band do not have any connection (so that the band does not have cohesion), the band is sufficiently stabilized for purposes of the invention (i.e. for the subsequent conversion to a filamentary web) because of its guidance under tension. Of course, once the connecting elements are applied, transverse stability of the resulting web is automatically assured, as will be appreciated.

It will be appreciated that the connecting elements may be applied to only one major surface of the band, although it is currently preferred to apply them to both major surfaces thereof. The application of the connecting elements to the filaments—and this bears repeating—is effected by applying pressure, but no melting or interweaving takes place as in the prior art.

The novel features which are considered to be characteristic of the invention are set forth in particular in the hereto appended claims. The improved method and device, however, together with details of the construction of the device and the best mode of operation currently known to applicant, as well as additional features and advantages of the invention, will be best understood upon a perusal of the following detailed description of specific although purely exemplary embodiments with reference to the accompanying drawing.

BRIEF DESCRIPTION OF THE DRAWING

FIG. 6 is a diagrammatic vertical longitudinal section through an apparatus according to the invention.

DESCRIPTION OF PREFERRED EMBODIMENTS

Figure 1:
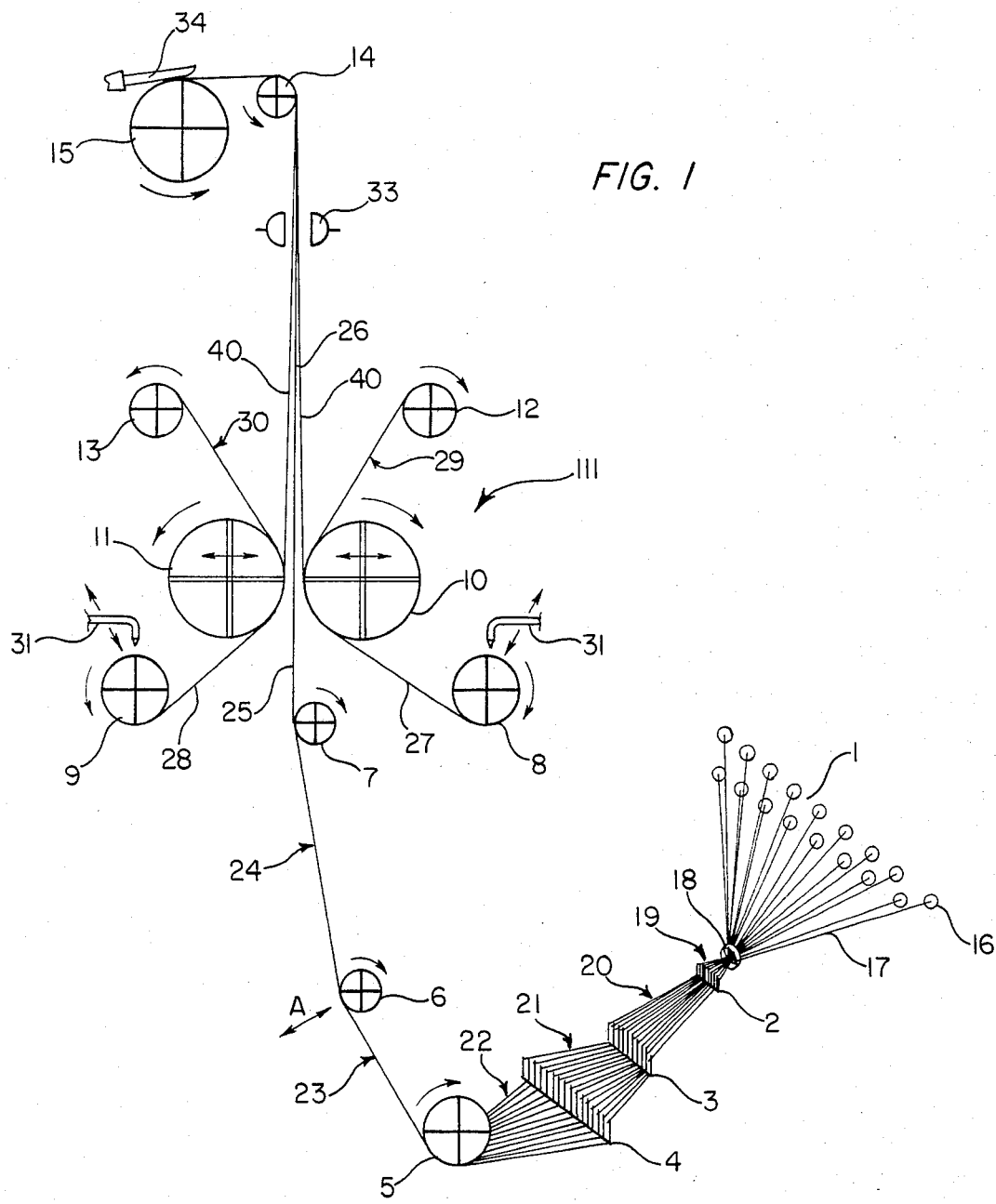
FIG. 1 is a diagrammatic illustration of an apparatus embodying the invention.

Referring now to the drawing, and firstly to FIG. 1 thereof, it will be seen that in this diagrammatic illustration a pluralitly of strands 17 of filamentary roving are supplied from a suitable supply device 1, e.g. a bobbin rack or shear frame. They may, for example, be withdrawn from spools or bobbins 16, as shown. The filaments making up the strands 17 may be carbon (or carbon-based) filaments, or they may be of (or on the basis of) aramide, polyester or glass. For the purposes of explanation of this embodiment, it will be assumed that the filaments are carbon filaments and that each of the individual strands 17 is composed of about 12,000 of such carbon filaments.

Having been supplied from the supply 1, the strands 17 are then combined by being passed through an eyelet 18 or analogous device known from the prior art. The resulting filamentary "rope" is then passed into and through a first spreading device 2 which, in the FIG. 1 embodiment, is generally in the form of a combshaped element having teeth 19 which effect the desired spreading function. Other devices capable of effecting such spreading and known per se can, of course, also be used. It should be noted that the strands 17 and the "rope" resulting from their passage through the eyelet 18 are untwisted; if they were twisted, this would evidently make the desired spreading difficult or even impossible.

After passing through the device 2, each individual strand 17 has a reduced number of filaments. To avoid misunderstandings, it should be pointed out here that the combination which occurs on passage through eyelet 18 does not destroy the integrity of the strands 17, that is, the aforementioned "rope" is really only a combination of strands 17 which have been moved close together by passage through the eyelet 18. As these strands 17 pass through the device 2, each strand is spread out and subdivided into two halves. On entering the zone 20, each of these halves will be composed of about 6,000 filaments. The thus halved strands then pass through a second spreading device 3 wherein they are each again halved and spread laterally so that in the zone 21 each of the resulting quarter-strands (as compared to the original strands 17 being drawn off from supply 1) is now composed of about 3,000 filaments. After passing through still another spreading device 4 and being halved again, the number of filaments per spread fragmentary strand is down to about 1,500. It goes without saying that the numbers mentioned above are for explanation only and are not to be considered limiting in any sense.

On reaching the zone 22, the filaments have been spread out to the desired extent. One may, if desired, start out with very fine filamentary strands in order to obtain in the final zone (here 22) a particularly fine, unidirectional filamentary band.

In any event, from the zone 22, the filaments pass onto a collecting roller 5 whose circumferential surface may be provided with a series of closely adjacent circumferential grooves (not shown) which facilitate and assure the unidirectional positioning of the filaments. The filaments, on thereafter reaching the zone 23, are now unidirectionally oriented in parallelism, or at least general parallelism, which is to say that, in the zone 23, they form a planar band 25 which does not yet, however, have any transverse stability since the filaments are not as yet connected in the transverse direction.

In view of this lack of transverse coherence and stability of the band 25, it is important to maintain proper control of the band. This is accomplished by maintaining the filaments of the band in tension for which purpose the band 25 is made to pass over a tensioning roller 6 the circumferential surface of which is provided with a series of axially successive grooves of small cross-section. Roller 6 can be moved in direction of the double-headed arrow A and arrested in desired locations (known per se) so as to permit a user to select the degree of tension to be imparted to the filaments. From roller 6, the band 25 passes through zone 24 and, from there, via a guide roller 7, into a working station 111.

In FIG. 1, this working station 111 is constituted by a pair of nip rollers 10 and 11 which are positioned at opposite sides of the path being traversed by the band 25. It should be noted in this connection that, for the sake of clearer illustration, the rollers 10, 11 have been shown spaced apart; the same is true of the finished filamentary web 26 as will be discussed later. In actual fact, however, such spacing does not exist.

The band 25 enters in vertical or near-vertical direction into the nip of rollers 10, 11. One or both of these rollers is positively driven in rotation and their circumferential surfaces are made of, or coated with or otherwise provided with, elastomeric material such as natural or synthetic rubber or a synthetic plastic.

The transverse connecting elements 40 are to be applied to the filaments of band 25 in the working station 111. For this purpose, they must be transported to the station which, in FIG. 1, is accomplished by means of carrier belts 27 and 28 (only one such belt is needed if the elements are to be applied to only one side of the band 25). These belts 27, 28 are supplied from supply rollers 8 and 9 which are located ahead (upstream) of the station 111 and they are subsequently taken up on take-up rollers 12 and 13 which are located past (downstream of) the station 111. On its way from the supply roller to the take-up roller, each belt 27, 28 passes through the nip of rollers 10, 11 and the band 25 is sandwiched between them during this passage through the nip. The surfaces of the belts 27, 28 which face the band 25 carry the connecting elements 40. These are detachable from the respective belt and have bonding faces that are directed outwardly, i.e. away from the belt and towards the band 25. Elements 40 are elongated in direction transverse to the path of movement of the respective belt, i.e. transverse to the elongation of the filaments which make up the band 25.

On entering the nip of rollers 10, 11 jointly with the band 25, the belts 27, 28 are pressed against the band 25 from opposite sides so that the elements 40 are transferred under application of pressure from their respective belts to the band 25 in such a manner that they extend transversely of the elongation of the filaments making up this band. In other words, the elements 40 in effect "straddle" the band 25.

The elements 40 may be applied to the belts 27, 28 in a separate operation after which the belts may—if necessary—be subjected to a drying step and then rolled up. In this condition, they may be placed on the rollers 8, 9 or, if already rolled up on similar rollers, these may be installed in place of the rollers 8, 9. However, the elements 40 may also be applied to the belts 27, 28 in a different manner. Shown in FIG. 1 is the possibility of applying them in situ on the moving belts by means of one or more nozzles 31 which move to and fro axially of the respective rollers 8 and 9 and which discharge thin flows or threads of a bonding composition onto the belts 27, 28. The composition may be a hot-melt adhesive; if so, the adhesive deposited on the belts will have cooled off by the time it reaches the nip of rollers 10, 11 so that the elements 40 are applied in cold state to the filaments of band 25. The danger of negative influence on these filaments (due to hot connecting elements, as in the prior art) is thus eliminated. Since the elements 40 are transferred to the filaments of band 25 in the nip, the belts 27, 28 are free of such elements on leaving the downstream end of the nip. They are then passed to the take-up rollers 12 and 13 via the zones 29 and 30, respectively. Subsequently, these belts are either discarded or, depending upon various factors such as the material of the belts, re-used one or more times.

The filaments of band 25, having had the connecting elements 40 applied to them in the nip of rollers 10, 11, are now transversely stabilized. In other words, the band 25 has been converted into a unitary filamentary web 26 which is the final desired product. This web 26—which may optionally first be passed through a drying station 33 of which the details are already known per se—is then deflected around a roller 14 and advanced to a take-up roller 15. If desired, one or more severing devices (here shown by way of example as blade 34) may be associated with the roller 15 to sever the web 26 into two or more narrower parallel strips. The severing devices may e.g. be in form of rotary blades or the like, or they may not be used at all if it is desired to use the web 26 in its full width.

For the sake of completeness, the web 26 is shown in FIG. 1 (in the zone intermediate the nip and the station 33) as being provided with the elements 40. To emphasize the relationship of these elements with respect to the filaments sandwiched between them, the filaments are shown as being located in a center plane and the elements 40 as being located in planes at opposite sides thereof. It is to be understood, however, that although these planes are shown to be spaced apart, they actually contact one another. In other words, beginning with the nip of rollers 10, 1 and continuing in the upward direction (in FIG. 1), there is no spacing between the filaments and the elements 40 since the latter are in direct contact with the filaments and bond these together in transverse direction of the web 26.

Figure 2:
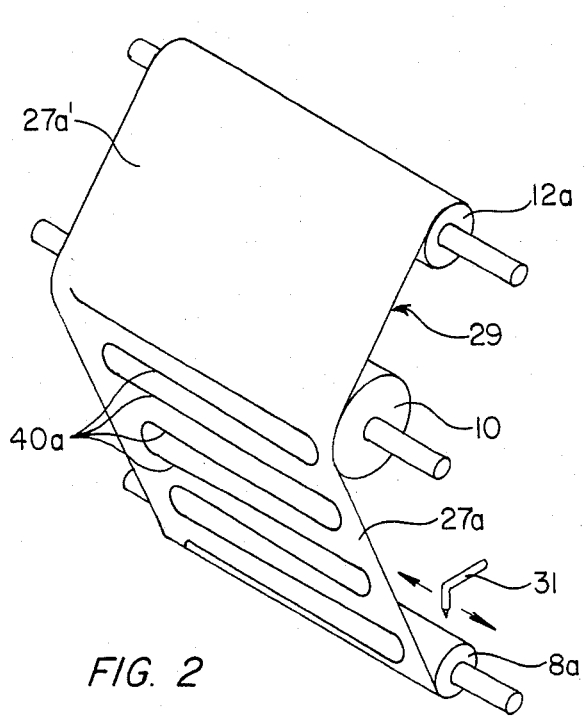
FIG. 2 is a perspective view illustrating a detail of an apparatus embodying the invention.
Figure 3:
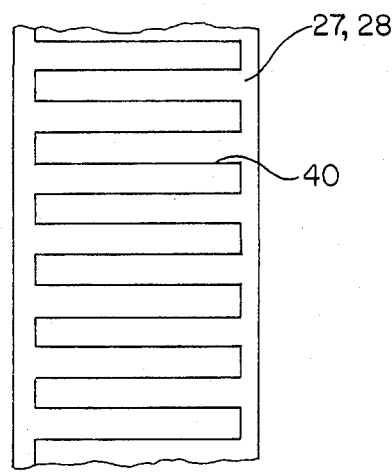
FIG. 3 is a fragmentary plan view showing a detail of an inventive apparatus.

The elements 40 may, but need not, extend normal to the elongation of the web filaments, nor is there any limitation as to the manner in which they may be applied. For example, in the embodiment of FIG. 2, a carrier belt 27a is shown which travels from the supply roller 8a to the take-up roller 12a via the nip of the rollers in the working station (only roller 10 shown). Here, the connecting elements 40a are applied to the belt 27a in a meandering pattern, for example, by means of the nozzle or nozzles 31 (one shown) which move to and fro axially of the roller 8a over the entire working width of the device and deposit the elements 40a e.g. in form of a hot-melt adhesive (such adhesives are known per se). No elements 40a are shown on the portion 27a of the belt 27a because in FIG. 2 this portion has already passed through the nip of rollers 10, 11 and its elements have been transferred in the nip to the filaments of band 25. FIG. 3 is a plan view showing either one of the belts 27, 28 (they are identical in this embodiment) and once more illustrating how the elements 40 can be applied in a meandering pattern.

Figure 4:
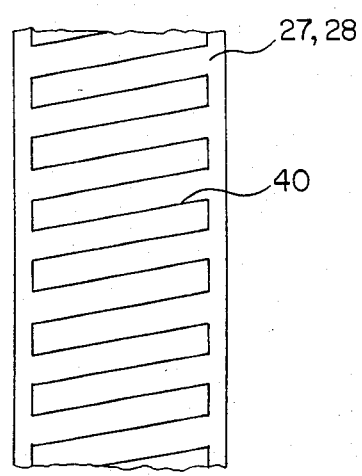
FIG. 4 is a view similar to FIG. 3 but illustrating a modification.

As mentioned before, the elements 40 need not extend normal to the elongation of the respective belt (and therefore also not normal to the elongation of the filaments in the finished web 26). They can be inclined or skewed as shown in the embodiment of FIG. 4. If they are deposited by one or more nozzles 31 (as in FIGS. 1-3), this inclination can be obtained by making the nozzle(s) travel axially to and fro of the roller 8 or 8a at a lesser speed than the speed of travel of the belts 27, 28.

However, these are details which can be modified within the scope of the invention. What is essential is that the elements 40 are applied first to the respective belt (and in such a manner that they extend transverse to the elongation of the filaments when in the nip of rollers 10, 11) and are only thereafter transferred to the filaments in the nip of station 111. Another important factor is that the band 25 is transversely stabilized (by having its filaments connected in transverse direction so as to become converted to web 26) in the station 111 where the connection of elements 40 to the filaments takes place under application of pressure.

Figure 5:
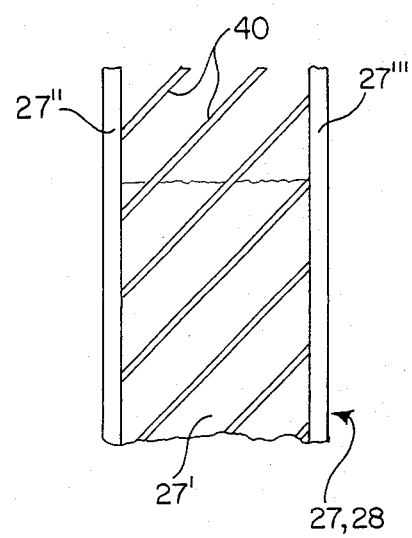
FIG. 5 is another view similar to that in FIG. 3, but illustrating a further embodiment.

FIGS. 5 and 6 may be considered together. in FIG. 6, the band 25 will be seen to enter the apparatus in direction from left to right. This may take place via a spreading device 4 (see FIG. 1) in form of a comb or the like, as previously discussed. Thereafter, the band 25 travels about two deflecting rollers 35, 36 and then passes through another spreading and thickness-reducing device 136, here constituted by two cooperating rollers 136a and 136b. The band 25 then enters the nip of rollers 10, 11 of the working station 111. In this embodiment, one of these pressure rollers is positively driven in rotation, namely, the roller 10 which is coupled with the illustrated motor 110. In addition, the roller 10 is coupled (known per se) to a cylinder-and-piston unit 210 by means of which it can be raised and lowered relative to the roller 11. Located at opposite sides of the plane in which the band 25 moves towards the nip of rollers 10, 11 are the supply rollers 8 and 9 which supply the belts 27, 28 as described hereinbefore. In this embodiment, the belts 27, 28 are actually each of tripartite construction in that each belt is composed of a broad tape carrying narrow strips on its respective transversely spaced marginal longitudinal edge portions. This is shown by way of example in FIG. 5 for the belt 27 where the tape is designated with reference numeral 27' and the strips with reference numerals 27'' and 27'''. The elements 40 which, in FIGS. 5 and 6 are again skewed as in FIG. 4, overlie the surface of tape 27' and are connected to the strips 27'' and 27'''. The elements 40 may be adhesive strips, threads, or the like. The belt 28 of FIGS. 4-6, like the belt 27, is composed of a tape 28' which carries transversely spaced strips 28'', 28''' and elements 40 connected to the strips 28'', 28'''.

As each belt 27, 28 reaches deflecting bars or rollers 37, 38, respectively, it strips (e.g. 27'' and 27''') become separated from its tape (e.g. 27'). The respective tape moves to and is taken up on one of the driven illustrated take-up rollers 112. Only the strips (e.g. 27'' and 27''') with the thereto connected elements 40 enter the nip of rollers 10, 11. In the nip, the pressure exerted by the rollers 10, 11 presses the elements 40 to the filaments of band 25 so that the adhere (bond) thereto. Downstream of the nip, the strips are severed from the elements 40 by e.g. the illustrated cutter blades 39 (one shown) and are then taken up on a take-up roller 212 which is driven as shown. Since the strips are located at opposite sides of band 25 (at this time converted into web 26), i.e. since their transverse spacing is greater than the width of band 25, the strips of belts 27, 28 can all be taken up on the illustrated roller 212. However, if desired, another roller 212 can be arranged at the other side of the plane in which the web 26 travels so that the strips of each belt are taken up on a separate roller 212. The finished filamentary web 26 is advanced to and taken up on the driven roller 15; if desired, an intermediate separating strip (not shown) may be taken up with the web 26 so as to separate the individual web convolutions from one another.

When the respective belt 27 or 28 is of the tripartite structure mentioned before (compare FIG. 5), the tape part (e.g. 27') of the belt may be of paper or a suitable foil material having a major surface which is either inherently anti-adhesive or is treated or coated so as to have this characteristic imparted to it. The strips (e.g. 27'' and 27''') may be of polyester or polyester fleece and may, on the surfaces which contact the tape, be provided with an adhesive, e.g. of the perma-bond type on an acrylate base or the like. It is advantageous to use the same adhesive on those surfaces of the elements 40 which, in the nip, will contact the filaments of band 25 (unless, of course, the elements 40 themselves are adhesive or have bonding capability) in order to insure uniform separation of the strips and elements 40 from the respective tape part (i.e. from the anti-adhesive surface thereof). It will be clear from the foregoing that the bonding capability of the elements 40 is needed only for bonding to the filaments of band 25 since bonding to the surface of the tape part (e.g. 27') is neither intended nor, in view of the anti-adhesive nature of that surface, possible. Thus, only the strips (e.g. 27'' and 27''') and the thereto connected elements 40 travel to the nip of rollers 10, 11 after separation from the tape part has occurred at the elements 37, 38. It has been found that no problems are experienced in guiding the strips with their elements 40 into the nip despite the reduction in structural stability which results from the detachment of the tape part.

It has been mentioned before that the elements 40 may be threads, strips or the like of hot-melt adhesive that is deposited onto the respective belt or belts. It has also been stated that the reinforcing filaments of band 25 are not to be subjected to heating, as in the prior art. These two aspects are not, however, a contradiction in terms as it might at first appear. The hot-melt adhesive is a viscous (paste-like) material which becomes liquified as it is heated prior to application. Thus, it contacts the belts 27, 28 in hot condition. However, it is applied only in form of threads or narrow strips which cool off immediately upon application to the respective belt so that, by the time the thus applied elements 40 reach the nip of rollers 10, 11 (and move into contact with the filaments of band 25), elements 40 are cold and cannot damage or otherwise influence the filaments.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the inventive contribution to the art. Therefore, such adaptations should—and indeed are intended to—be comprehended within the meaning and scope of equivalence of the appended claims.

I claim:

1. A method of making filamentary webs, particularly from carbon-based, aramide-based, polyester-based and glass-based fibers, comprising the steps of
   (a) forming an elongated band having a plurality of unidirectionally oriented, unconnected filaments;
   (b) advancing said band through a working station;
   (c) transporting elongated self-supporting connecting elements to said working station on a carrier, each of said connecting elements having a base strip and a coating of non-polymerizable dry adhesive on the base strip, and said carrier conveying said connecting elements into said working station in such a manner that said adhesive coatings face and said base strips extend transversely of said band;
   (d) bonding said connecting elements to said band in said working station so that said connecting elements join said filaments and form a unitary filamentary web therewith, the bonding step being performed in the substantial absence of heat by pressing said dry adhesive coatings against said band; and
   (e) separating the carrier from the connecting elements upon completion of the bonding step.

2. A method as defined in claim 1, wherein the bonding step comprises effecting substantially continuous bonding of said elements to the band.

3. A method as defined in claim 1, wherein the carrier is a carrier belt; and further comprising the step of applying the connecting elements to the belt prior to the step of transporting them to said working station.

4. A method as defined in claim 1, wherein the forming comprises substantially continuously forwarding at least one untwisted roving of filaments from at least one supply, and spreading the filaments of the roving transversely so as to form said elongated band.

5. A method as defined in claim 4, said roving initially having a predetermined thickness and a predetermined width; and wherein the spreading step comprises reducing said thickness while increasing said width.

6. A method as defined in claim 4, wherein the spreading step comprises flattening said roving.

7. A method as defined in claim 1; further comprising the steps of passing the filamentary web to a take-up station, and severing the web at said take-up station to form narrow strips of web.

8. A method as defined in claim 1, wherein said filaments comprise reinforcing filaments.

9. A method as defined in claim 1, wherein the forming, advancing, transporting and bonding steps are performed substantially continuously.

10. A method as defined in claim 1, said carrier being elongated and flexible; and further comprising the step of winding said carrier into a roll after the separating step.

11. A method as defined in claim 1, said band having opposite major surfaces; and wherein the transporting and bonding steps are performed at each of said major surfaces.

12. A method as defined in claim 1, further comprising the step of applying the connecting elements to the carrier in a meandering pattern.

13. A method of making filamentary webs, particularly from carbon-based, aramide-based, polyester-based and glass-based fibers, comprising the steps of:
   (a) forming an elongated band having a plurality of undirectionally oriented, unconnected filaments;
   (b) advancing the band through a working station;
   (c) transporting elongated self-supporting connecting elements to the working station on a carrier, each connecting element having a base strip and a non-polymerizable coating of dry adhesive on the base strip, the carrier being mounted on a tape and including a pair of spaced strips extending transversely of and connected with the connecting elements, the carrier conveying the connecting elements into the working station in such a manner that the adhesive coatings face and the base strips extend transversely of the band;
   (d) separating the tape from the spaced strips of the carrier and from the connecting elements; and thereupon
   (e) bonding the connecting elements to the band in the working station so that the connecting elements join the fialaments and form a unitary filamentary web therewith, the bonding step being performed in the substantial absence of heat by pressing the dry adhesive coatings against the band.

14. A method as defined in claim 13, wherein said strips are separated from said connecting elements after the bonding step.

15. A method as defined in claim 14, wherein said strips of the carrier are separated from said connecting elements by severing the latter.

16. An apparatus for making filamentary webs, particularly from carbon-based, aramide-based, polyester-based and glass-based fibers, comprising:
   (a) a first source of elongated band having a plurality of unidirectionally oriented, unconnected filaments;
   (b) advancing means for advancing said band along a first path having a first working portion;
   (c) a second source of a composite member including a flexible, elongated carrier, and elongated self-supporting connecting elements supported by said carrier, each connecting element having a base strip and a coating of non-polymerizable dry adhesive on the base strip;
   (d) transporting means for transporting said composite member along a second path having a second working portion adjacent to said first working portion of said first path, said transporting means being arranged to convey said composite member into said second working portion in such a manner that the adhesive coatings of said connecting elements face and said base strips extend transversely of said band in said first working portion;
   (e) contacting means adjacent to said first and second working portions for urging the adhesive coatings of said connecting elements into engagement with said band in the substantial absence of heat so that said connecting elements are bonded to said band thereby joining said filaments and forming a unitary filamentary web therewith; and
   (f) means for separating the carrier from the connecting elements downstream of said working portions.

17. An apparatus as defined in claim 16, wherein said apparatus is devoid of heating means at said sources and along said paths.

18. An apparatus as defined in claim 16, wherein said first source comprises first means for supplying at least one strand having a plurality of elongated, unconnected filaments, and second means for converting said strand into a component of said band.

19. An apparatus as defined in claim 18, said second means comprising a strand-spreading device intermediate said first means and said second working portion.

20. An apparatus as defined in claim 19, said strand-spreading device comprising a plurality of components which spread the strand in successive stages to increasing extents until an elongated band of desired width has been formed.

21. An apparatus as defined in claim 16, said advancing means comprising a take-up roller for the filamentary web; and further comprising means for severing the web into sections.

22. An apparatus as defined in claim 16, said contacting means comprising a pair of cooperating nip rollers.

23. An apparatus as defined in claim 16, wherein said filaments comprise reinforcing filaments.

24. An apparatus as defined in claim 16, wherein said advancing, transporting and contacting means are designed for substantially continuous operation.

25. An apparatus as defined in claim 16, wherein said band has opposite major surfaces and said second source and said transporting means are arranged for application of said connecting elements to one of said major surfaces; and further comprising an additional source similar to said second source, and conveying means similar to said transporting means, said additional source and said conveying means being arranged for application of additional connecting elements to the other of said major surfaces.

26. An apparatus as defined in claim 16, wherein said second path makes an acute angle with said first working portion of said first path both upstream and downstream of said first working portion.

27. An apparatus as defined in claim 16, said transporting means comprising at least one carrier take-up roller upstream and located upstream and downstream of said working portions.

28. An apparatus as defined in claim 27, said second source including at least one supply roller for the carrier upstream of said second working portion.

29. An apparatus for making filamentary webs, particularly from carbon-based, aramide-based, polyester-based and glass-based fibers, comprising:
(a) first means for supplying at least one strand composed of a plurality of unconnected, elongated filaments;
(b) second means for forming from the filaments of said strand an elongated band in which said filaments are unidirectionally oriented and unconnected with one another;
(c) third means for advancing said band through a working station;
(d) fourth means for supplying a carrier which supports elongated self-supporting connecting elements each of which has a base strip and a non-polymerizable coating of dry adhesive on the base strip and transporting said carrier to said working station so that said connecting elements extend transversely of said band, said carrier including a pair of transversely spaced strips which are detachably mounted on a surface of a tape, and said connecting elements being affixed to the strips of said carrier and overlying said surface, said fourth means including a source upstream of said working station for supplying said tape with the strips of said carrier and said connecting elements mounted thereon;
(e) fifth means for removing said tape from the strips of said carrier and said connecting elements between said source and said working station and diverting said tape from said working station; and
(f) sixth means for transferring said connecting elements from the strips of said carrier to said band in said working station in the substantial absence of heat and using contact pressure so that said connecting elements adhere to and join said filaments transversely of said band thereby forming a unitary filamentary web with said filaments.

30. A combination as defined in claim 29, said surface being an antiadhesive surface, and said coatings overlying said surface.

31. A combination as defined in claim 30, wherein the adhesive of said coatings is a permanent-bond adhesive capable of bonding with said filaments but incapable of bonding with said surface.

* * * * *